United States Patent [19]

Herrick

[11] Patent Number: 4,481,076

[45] Date of Patent: Nov. 6, 1984

[54] REDISPERSIBLE MICROFIBRILLATED CELLULOSE

[75] Inventor: Franklin W. Herrick, Shelton, Wash.

[73] Assignee: International Telephone and Telegraph Corporation, New York, N.Y.

[21] Appl. No.: 479,555

[22] Filed: Mar. 28, 1983

[51] Int. Cl.$^3$ .............................................. D21H 3/00
[52] U.S. Cl. ........................................ 162/158; 162/9; 162/100; 162/175; 162/177; 162/181.2; 162/181.3; 162/182; 162/187
[58] Field of Search ............... 162/141, 176, 187, 175, 162/158, 201, 100, 24, 9, 182, 183, 181.2, 181.3; 241/5, 28, 40

[56] References Cited

U.S. PATENT DOCUMENTS

| | | | |
|---|---|---|---|
| 1,406,410 | 2/1922 | Peabody | 162/176 |
| 1,704,533 | 3/1929 | DeCew | 162/187 |
| 1,992,996 | 3/1935 | Dodge | 162/187 |
| 2,132,724 | 10/1938 | Dalton | 162/176 |
| 2,566,130 | 8/1951 | Karlson et al. | 162/187 |
| 4,144,122 | 3/1979 | Emanuelsson et al. | 162/158 |
| 4,341,807 | 7/1982 | Turbak et al. | 426/589 |
| 4,374,702 | 2/1983 | Turbak et al. | 162/187 |

FOREIGN PATENT DOCUMENTS 949464 2/1964 United Kingdom ................ 162/187

OTHER PUBLICATIONS

Clark, *The Nature of Hydration and Fiber Bonding*, The Paper Industry and Paper World, (Aug. 1943), pp. 507–510.
Svensk Papperstidning, Kolmodin et al., No. 12, pp. 73–78, 1981.

*Primary Examiner*—Peter Chin
*Attorney, Agent, or Firm*—James B. Raden; Harold J. Holt

[57] ABSTRACT

Redispersible microfibrillated cellulose is prepared by the addition to a liquid dispersion of the microfibrillated cellulose, an additive compound capable of substantially inhibiting hydrogen bonding between the cellulose fibrils. The microfibrillated cellulose, upon drying, is characterized by having a viscosity when redispersed in water of at least 50% of the viscosity of an equivalent concentration of the original dispersion.

20 Claims, No Drawings

REDISPERSIBLE MICROFIBRILLATED CELLULOSE

This invention relates to redispersible microfibrillated cellulose and to a process of preparing microfibrillated cellulose which may be dried and redispersed.

Microfibrillated cellulose is a natural cellulose in which the cellulose fibers have been opened up and unravelled to form fibrils and microfibrils by repeated passage through a homogenizer. Microfibrillated cellulose is characterized by very high water retention values, a high degree of chemical accessibility and the ability to form stable gels in water or other polar solvents. Its preparation and properties are more fully disclosed in U.S. Pat. No. 4,374,702 and a variety of uses are shown in U.S. Pat. Nos. 4,341,807 and 4,378,381. The disclosure of these U.S. patents is hereby incorporated by reference.

A dispersion of microfibrillated cellulose in water is a gel having pseudoplastic or thixotropic viscosity properties. On drying, however, the properties of microfibrillated cellulose are severely modified. Its dispersibility, hydration and viscosity properties are lost or substantially reduced, depending on the severity of drying. Microfibrillated cellulose has many end uses, such as in foods, cosmetics and medicinal products in which it would be advantageous to use microfibrillated cellulose formulations that can be dried and redispersed without loss of viscosity or other properties. In other uses, it would be advantageous to prevent hornification and physical disruption that has been found to occur upon drying.

The ability to be rehydrated, after drying or dehydration, is a desirable goal for many hydrated materials, both cellulosic and non-cellulosic. This is a particularly desirable goal for many foods and medicines which, once dehydrated, are difficult or impossible to rehydrate. In the case of conventional cellulosic pulps, drying is known to reduce the chemical reactivity and water absorbency of the pulps. It is also known in wood pulp technology that certain additives can be used to reduce the inter-fiber bonding that occurs on drying. Debonding agents have been added to pulps before drying to reduce the energy required to defiber pulp sheets; i.e., separate the dry fibers for use, for example, in fluffed pulps. Such debonding agents are generally cationic surfactants such as fatty acid quaternary amines which function at low percentage additions. See, for example, Svensk Papperstidning, Kolmodin et al, No. 12, pgs. 73–78, 1981 and U.S. Pat. No. 4,144,122. However, the surface of microfibrillated cellulose is enormously greater than that of ordinary wood pulp fibers; e.g., on the order of a thousand times greater, and thus the problems of hornification and physical disruption on drying are order of magnitude more severe with microfibrillated cellulose.

It is a major object of this invention to provide dry microfibrillated cellulose which is substantially unchanged when dried and which may be rehydrated and redispersed in water to a viscosity essentially equivalent to that of undried microfibrillated cellulose.

It is an additional object of the present invention to provide a convenient and economical process for avoiding irreversible changes that occur in microfibrillated cellulose upon drying.

The foregoing and other objects of the invention are achieved by a process comprising microfibrillating cellulose while suspended in a liquid medium therefore, drying the suspension of microfibrillated cellulose while there is present in said suspension a compound capable of substantially inhibiting hydrogen bonding between the fibrils in the cellulose. The product of the invention is dry microfibrillated cellulose characterized by having a viscosity when redispersed in water of at least fifty percent of the viscosity of an equivalent concentration of said microfibrillated cellulose dispersed in water prior to drying.

The mechanism by which an additive yields a redispersible microfibrillated cellulose is believed to be related to the prevention of drying stress or hornification of cellulose by hydrogen bonding. The additive forms hydrogen bonds or complexes with the cellulose fibrils and prevents them from bonding to each other, thus forming a tight difficulty hydratable product. In the presence of additive, the cellulose fibrils remain accessible to water and are easily rehydrated to form high-viscosity dispersions. The additive should accordingly be a compound capable of substantially inhibiting hydrogen bonding between the cellulosic fibrils in the cellulose. It should also be one which does not react with the cellulose, nor have substantial volatility, at the drying temperature. A wide number of organic and inorganic additive compounds, both liquid and solid, have been tested and certain of the compounds have been found to possess the characteristics required to yield redispersible microfibrillated cellulose. It has further been found that the additive compounds must be used in substantial quantities, generally at least one half the dried weight of the microfibrillated cellulose and preferably at least equal to the microfibrillated cellulose weight. Among the most useful additives are polyhydroxy compounds including particularly carbohydrates or carbohydrate related compounds, other than cellulose itself, such as glycols, sugars, carbohydrate gums, starches, oligo- and polysaccharides, seaweed (marine plant) extracts and derivatives of the carbohydrates and glycol related compounds. By derivatives herein is meant substituted or other first stage reaction products of carbohydrates or glycols which retain their polyhydroxy functionality and their carbohydrate or glycol characteristics. Useful glycols include ethylene, propylene, dipropylene and butylene glycol, glycerin and low molecular weight glycol polymers such as the polyglycols and such glycol derivatives as triethanolamine. Useful sugars include the common 5 and 6 carbon sugars such as glucose, dextrose, mannose and galactose and disaccharides such as sucrose and lactose; sugar alcohols such as mannitol and sorbitol; such carbohydrate derivatives as the bisulfite adducts of the common sugars such as sodium mannose bisulfite and sodium glucose bisulfite; sugar acids such as aldonic acids, saccharic and saccharinic acids and uronic acids; and the very broad glycoside group of acetal derivatives of sugars such as methyl glucoside. Certain foods containing large proportions of sugars, pectins or plant gums are also useful such as fruit and vegetable pulps and non-fat dry milk. Other useful carbohydrate derivatives are the carboxymethyl and hydroxyethyl starches, carboxymethyl and hydroxyethyl cellulose and methyl and ethyl cellulose. A very effective and economical polyhydroxy additive is sucrose, a disaccharide that is easily dried as a nonhydrated complex with microfibrillated cellulose.

In addition to the polyhydroxy compounds, the alkali metal (e.g., sodium, potassium) salts of borates, polyborates, phosphates and polyphosphates are also useful, although not as effective as the polyhydroxy compounds. In addition, certain aprotic solvents such as dimethylsulfoxide or a dialkylacylamide such as dimethylacetamide and dimethylformamide are also effective additives. These aprotic solvents, are components of solvent systems for cellulose (see for example U.S. Pat. Nos. 4,076,933 and 4,302,252). The inorganic salts and aprotic solvents are believed to form complexes with cellulose or hydroxyl groups and thus prevent hydrogen bonding.

In general, low molecular weight compounds are the best additives. At approximately equal levels of microfibrillated cellulose and additive, low molecular weight compounds do not affect viscosity characteristics of the dispersion. Higher molecular weight additives, such as carboxymethyl cellulose or hydroxyethyl cellulose, increase viscosity in proportion to their concentration and molecular weight; however, such mixtures redisperse very nicely, indicating that molecular size does not prevent hydrogen bonding with microfibrillated cellulose on drying which in turn prevents microfibrillated cellulose from bonding with itself.

In the aforementioned U.S. Pat. Nos. 4,341,807 and 4,378,381 covering uses of microfibrillated cellulose, reference is made to the preparation of microfibrillated cellulose with mixtures of glycerin and water and to the addition of certain hydrophilic polymers to assist the process of microfibrillation of the cellulose. There is also disclosed the addition of such food additives as sucrose to certain of the microfibrillated cellulose formulations. However, there is no disclosure of drying cellulose with these additives nor is there recognition in this patent and application that these additives are capable of preventing irreversible modification of the microfibrillated cellulose when dried.

The amount of the additive required to yield redispersible microfibrillated celulose will vary considerably depending on which additive is used, the degree of microfibrillation of the cellulose, the extent to which the microfibrillated cellulose is subsequently dried and the severity of the drying process. Generally, however, when used as an additive to enhance redispersion, the amount will vary from as little as one half to as high as twice the weight of the cellulose. If the additive is itself intended as the major component of the product, if may be used in amounts considerably exceeding even twice the weight of the cellulose. The additive may be mixed or dissolved in the microfibrillated cellulose slurry or it may be added to the liquid suspension of fibrous cellulose prior to microfibrillation in a homogenizer. An advantage of mixing the additive with the fibrous cellulose prior to microfibrillation is that it would reduce the cost of homogenization if the process is based on the use of dry wood pulp raw materials. Cellulosic pulps that have not previously been dried, so-called never-dried pulps, are more responsive to homogenization than dry pulp stocks. Drying the pulp with the additive present prevents a type of drying stress that occurs and is equivalent to a number of passes of homogenization. Thus, for example, instead of a 10 pass homogenization process on standard dry pulp without additive to produce a high-viscosity microfibrillated cellulose, a 5 pass process on dry additive-treated pulp will obtain similar viscosity characteristics. This invention is the subject of my copending application Ser. No. 479,556, filed of even date herewith.

The fibrous cellulose or microfibrillated cellulose may be dried by any one of a number of drying techniques well known in the art. Drying at from 25° to 105° C. under ambient or forced-draft conditions and both freeze and spray drying have been carried out experimentally. Room temperature drying is not effective for many additives because water is held as a hydrate. A 50°-70° C. drying temperature is the most practical and corresponds to temperature used in drying many food products with which microfibrillated cellulose finds great utility.

Microfibrillated cellulose is normally prepared as a liquid dispersion or suspension containing less than about 10% cellulose by weight and usually from about 1-6%, the specific concentration depending on whether cut or uncut pulp stocks or whether laboratory or commercial size homogenizers are used in microfibrillated cellulose preparation. Except as otherwise herein set forth, the preparation of microfibrillated cellulose is as set forth in the aforesaid U.S. Pat. No. 4,374,702. As there set forth, the process involves passing a liquid suspension of fibrous cellulose through a small diameter orifice in which the suspension is subjected to a pressure drop of at least 3000 psi and a high velocity shearing action followed by a high velocity decelerating impact and repeating the passage of the suspension through the orifice until the cellulose suspension becomes substantially stable. The resulting microfibrillated cellulose product is generally characterized as having a water retention value of over 280%, a settling volume after 60 minutes in a 0.5% by weight suspension in water of greater than 60% and a rate of degradation increase by hydrolysis at 60° C. in one molar hydrochloric acid at least twice as great as cellulose beaten to a Canadian Standard Freeness value of 50.

The dried microfibrillated cellulose product of the present invention is characterized herein in terms of its ability to recover at least 50% of its initial viscosity in water. Viscosity is used in this characterization because it is an accurate measure of the ability of a carbohydrate material to form a hydrated structure. Without the additive of the invention, microfibrillated cellulose recovers from as little as 2% to a maximum of 20% of its original viscosity after it is dried, again depending on the severity of drying. In the preferred practice of the invention, this recovery is over 75% and in many cases the recovery approaches nearly 100% of the original viscosity.

The following examples illustrate the practice of the invention. Unless otherwise indicated, all parts and percentages are by weight.

EXAMPLE 1

In this example, a 20.8 liter volume of 2% microfibrillated cellulose was prepared from a southern pine sulfite pulp. The pulp was dry cut to reduce the pulp fiber length to 0.7 mm. A small commercial Gaulin homogenizer was used at 55 mPa (megaPascals, 8000 psi) pressure. A 12 l volume of 0.8% microfibrillated cellulose (96 g cellulose), from a previous run was used as a suspending agent for an additional 320 g dry-basis pulp (340 g as is, 6% moisture) and 8760 ml of deionized water. The dilute microfibrillated cellulose slurry (12 l) was placed in a homogenizer reservoir and operation of both the homogenizer and feed pumps was begun. Pressure was adjusted to 55 mPa (8000 psi). The dry-cut pulp (340 g as is) was slurried in 4 l of water, mixed with the remaining water (4760 ml) and dilute microfibrillated cellulose in several portions, all of which were added back to the system from the top of the reservoir. This operation required about 20 minutes and temperature rose to 70° C. At this point timing was begun so that all of the input pulp fibers received 10 passes through the homogenizer. Process temperature was controlled in the range of 75° to 85° C. by applying cooling water to the jacketed recirculating lines. Initially it was assumed that pumping rate through the homogenizer was 5 l/min. This pumping rate was confirmed by measurement at about 2, 5 and 8 passes and total homogenizing time adjusted accordingly. In this example, total homogenizing time for 10 passes was 42 minutes. The recovered final product volume was 16 l, containing 2.02% solids. Holdup in the apparatus was 5 l, which could be mostly recovered by dilution and displacement with water, for use as a suspending agent in subsequent runs. The product had the following viscosity properties at 22° C., measured with a Fann Model 39 recording viscometer:

| Shear Rate, sec$^{-1}$ | Viscosity, mPa · s |
|---|---|
| 100 | 1366 |
| 500 | 402 |
| 1000 | 248 |

Following the processing of a cellulose slurry and the desired number of (volume) passes through the homogenizer, the microfibrillated cellulose product was cooled to room temperature and stored in a suitable closed container. Before testing or sampling for analyses all products were carefully remixed or shaken. The solids content of microfibrillated cellulose products was determined by drying 10 to 20 g samples for 18 hours at 80° C. in a forced draft oven, followed by two hours at 105° C.

A simple test to measure the effectiveness of the additive was used. The test involved mixing 400 g of 2% microfibrillated cellulose (8 g microfibrillated cellulose solids) with 8 g dry basis additive. The viscosity of this mixture was recorded. Dry films were then prepared because the drying rate and stress of films could be controlled with relatively small samples. The films were then cut into small squares and redispersed at 2% microfibrillated cellulose solids in water. Unless otherwise indicated, this test, as more specifically set forth in Example 2, was used in all of the examples.

EXAMPLE 2

Various proportions of sucrose were added to 2% dispersions of microfibrillated cellulose prepared as set forth in Example 1. Dry films were then prepared from the microfibrillated cellulose/sucrose dispersions by placing about 90 g of the microfibrillated cellulose product on a polished chrome-plated steel sheet (25×36 cm). A stainless steel bar, adjusted to a height of 2.5 mm above the sheet, was used to spread the material into a rectangular shape of 16×22 cm. This uniform layer of the microfibrillated cellulose product was then dried in a forced-draft oven at 60° C. for about 2 hours. The resulting dry film of about 0.04 to 0.08 mm thickness, depending on the additive content, was stored in a plastic film envelope until used in tests. Film moisture content under these conditions was about 5%.

In both this and the following examples, films prepared as set forth above, were cut into 2×2 cm pieces and added to water to produce a 2% microfibrillated cellulose dispersion. For example, a 50/50 microfibrillated cellulose/sucrose dispersion was prepared by adding a 4.2 g sample (4 g dry basis) of microfibrillated cellulose/sucrose to 95.8 g water. The 100 g sample was stirred with an electric counter-rotating mixer for 10 minutes at moderate speed and at room temperature. The viscosity was measured with a recording viscometer at room temperature (22° to 24° C.). The viscosity at a shear rate of 1000 sec$^{-1}$ was used in comparing the characteristics of the microfibrillated cellulose dispersions. Table I compares the viscosity of the dispersions before and after drying of various proportions of sucrose additive at various drying temperature.

TABLE I

| Sample | MFC/Sucrose | Viscosity Original Dispersion mPa · s, 1000 sec$^{-1}$ | Drying °C. | Viscosity Redispersion mPa · s, 1000 sec$^{-1}$ |
|---|---|---|---|---|
| 1 | 100/0 (control) | 226 | 60 | 38 |
| 2 | 16.5/83.5 | 236 | 60 | 282 |
| 3 | 66.7/33.3 | 224 | 60 | 199 |
| 4 | 50.0/50.0 | 224 | 25 | 228 |
| 5 | 66.7/33.3 | 201 | 60 | 154 |
| 6 | 50.0/50.0 | 176 | 60 | 185 |

Table I shows that a 50/50 (wt/wt) MFC/Sucrose mixture can be dried at 60° C. without reducing the viscosity of the redispersed product (at 25° C. drying was unduly lengthened); sucrose at ratios over 50/50 yield a completely redispersible high viscosity MFC; ratios of sucrose of less than 50/50 yield a redispersible MFC but with some loss in visosity. Optimum levels of sucrose range from about 33% to as much as 200% by weight of the cellulose.

EXAMPLE 3

A series of additional comparative tests were conducted as in Example 2 but using glycerin, rather than sucrose as the additive. All samples were dried at 60° C. Although anhydrous glycerin does not lose weight in 2 hours at 60° C., some loss of glycerin was evidently caused by the presence of water during drying for these tests. The results are shown in Table II.

TABLE II

| Sample | MFC/Glycerin | Viscosity Original Dispersion mPa · s, 1000 sec$^{-1}$ | Viscosity Redispersion mPa · s, 1000 sec$^{-1}$ |
|---|---|---|---|
| 1 | 50/50 | 228 | 182 |
| 2 | 28.5/71.5 | 222 | * |
| 3 | 16.5/83.5 | 219 | * |
| 4 | 80/20 | 226 | 62 |
| 5 | 66.7/33.3 | 226 | 188 |
| 6 | 50/50 | 226 | 200 |
| 7 | 66.7/33.3 | 226 | 201 |
| 8 | 66.7/33.3 | 193 | 119 |
| 9 | 50/50 | 189 | 191 |

*MFC redispersed but the films remained tacky because of excess glycerine.

As in the case of sucrose, Table II shows that 50/50 mixtures of MFC/glycerin can be dried with little effect on viscosity. At levels above about 70%, it becomes difficult to dry the dispersions. At glycerin levels below about 33%, some viscosity loss occurs. Optimum levels of glycerin range from about 40 to 60% of the MFC weight. These results may again be compared with Sample 1, the control, in Table I.

EXAMPLE 4

The tests of Examples 2 and 3 were repeated using ethylene glycol and propylene glycol as the additives.

Again drying of the redispersed mixtures was at 60° C. The results are shown in Table III.

TABLE III

| Sample | MFC/Glycol | Viscosity Original Dispersion mPa·s, 1000 sec$^{-1}$ | Viscosity Redispersion mPa·s, 1000 sec$^{-1}$ |
|---|---|---|---|
| | Ethylene glycol* | | |
| 1 | 66.7/33.3 | 224 | 71 |
| 2 | 50/50 | 224 | 337 |
| | Propylene glycol* | | |
| 3 | 66.7/33.3 | 191 | 180 |

*Ethylene glycol, and to a lesser extent, propylene glycol were subject to volatile loss in drying in the presence of water. Thus, results at higher glycol levels did not give meaningful comparative viscosity levels.

These glycols thus yield dispersible dry MFC at 50/50 and higher MFC/glycol levels. Ethylene glycol loss on drying at 60° C. made it less effective at the lower levels.

EXAMPLE 5

Comparative tests were carried out with sugars other than sucrose and with sugar derivatives. All samples were at 50/50 MFC/additive levels to 2% MFC dispersions. The results are shown in Table IV.

TABLE IV

| Sample | Additive | Viscosity Original Dispersion mPa·s, 1000 sec$^{-1}$ | Viscosity Redispersion mPa·s, 1000 sec$^{-1}$ |
|---|---|---|---|
| 1 | dextrose (glucose) | 256 | 250 |
| 2 | galactose | 180 | 205 |
| 3 | sodium glucoheptonate | 195 | 244 |
| 4 | sorbitol | 195 | 191 |
| 5 | mannitol | 250 | 187 |
| 6 | xylose | 183 | 209 |
| 7 | methyl-α-D glucoside | 176 | 218 |

All of the sugar and sugar derivative additives of Table IV were effective for producing exceptionally smooth redispersions of dried MFC at the 50/50 MFC/additive levels. The variation in original dispersion viscosity was largely the result of the use of different 2% MFC preparations. Reference should again be made to the viscosity of the 2% MFC control dispersion, Sample 1 of Table I, for comparative redispersibility results without any additive.

EXAMPLE 6

The following tests were carried out with 2% MFC dispersions with a variety of additives, including starch, a glycol, and inorganic salts. All additives were at the 50/50 MFC/additive level. Results are set forth in Table V.

TABLE V

| Sample | Additive | Viscosity Original Dispersion mPa·s, 1000 sec$^{-1}$ | Viscosity Redispersion mPa·s, 1000 sec$^{-1}$ |
|---|---|---|---|
| 1 | none (control) | 226 | 38 |
| 2 | soluble starch (potato) | 213 | 160 |
| 3 | dipropylene glycol | 187 | 277 |
| 4 | trisodium phosphate | 230 | 139 |
| 5 | disodium hydrogen phosphate | 217 | 143 |
| 6 | sodium perborate | 238 | 135 |

Starch was a particularly effective additive. Even though the viscosity of the redispersion was reduced somewhat to 160 mPa.s, the redispersion was quite smooth and produced a good stable gel. Certain alkali metal salts of phosphates and borates are partially effective. Dipropylene glycol appears to react with MFC.

EXAMPLE 7

Various food products were used as additives to 2% MFC dispersions, all at 50/50 MFC/additive levels and films were dried at 60° C. Results are set forth below.

TABLE VI

| Sample | Additive | Viscosity Original Dispersion mPa·s, 1000 sec$^{-1}$ | Viscosity Redispersion mPa·s, 1000 sec$^{-1}$ |
|---|---|---|---|
| 1 | non-fat dry milk | 197 | 201 |
| 2 | apple cooked pulp | 160* | 158 |
| 3 | carrot cooked pulp | 150* | 146 |
| 4 | dextrin | 189 | 152 |

*These viscosity values are estimates extrapolated from the viscosity of the base 2% MFC mixtures.

Non-fat dry milk contains the disaccharide lactose while apple and carrot contain pectin on the one hand and gums and sugars on the other, respectively. Dextrin is a low molecular weight hydrolyzed starch. All four of these additives were effective in varying degrees to produce redispersions of the MFC.

EXAMPLE 8

Various cellulose derived or natural gums or seaweed extracts were added to 2% MFC dispersion, all at 50/50 MFC/additive levels and films were dried at 60° C. Results are set forth in Table VII.

TABLE VII

| Sample | Additive | Viscosity Original Dispersion mPa·s, 1000 sec$^{-1}$ | Viscosity Redispersion mPa·s, 1000 sec$^{-1}$ |
|---|---|---|---|
| 1 | pectin | 197 | 180 |
| 2 | quar gum | 172 | 258 |
| 3 | gum arabic | 197 | 191 |
| 4 | agar (seaweed extract) | 250 | 133 |
| 5 | sodium carboxymethyl cellulose (medium viscosity) | 416 | 496 |
| 6* | hydroxyethyl cellulose (high viscosity) | 156 | 148 |

*This sample was at total 2% solids - 1% MFC, 1% HEC.

All of the above additives were effective. The simple low molecular weight gums (samples 1–4) were best in that the MFC-additive viscosity was not affected. The polymer gums (samples 5 and 6) have their own viscosity superimposed on that of MFC.

EXAMPLE 9

Various organic compounds were added to 2% MFC dispersions at 50/50 MFC/additive levels and films were dried at 60° C. Results are set forth in Table VIII.

TABLE VIII

| Sample | Additive | Viscosity Original Dispersion mPa · s, 1000 sec$^{-1}$ | Viscosity Redispersion mPa · s, 1000 sec$^{-1}$ |
|---|---|---|---|
| 1 | dimethylacetamide | 172 | 208 |
| 2 | dimethylsulfoxide | 171 | 289 |
| 3 | triethanol amine | 185 | 258 |

The aprotic solvents, dimethylacetamide and dimethylsulfoxide, were effective, as was triethanol amine, to produce excellent MFC redispersions by forming complexes with the cellulose.

EXAMPLE 10

In this example, quaternary ammonium compounds of the type disclosed in U.S. Pat. No. 4,144,122 were used as the additive. In all samples, the additive was a fatty acid quaternary amine sold under the trademark Berocell 584. The amount of the quaternary compounds was varied from slightly less than 0.2% by weight of the MFC to an amount equal to the MFC weight. The results were as follows:

TABLE IX

| Sample | MFC/Quaternary Amine | Viscosity Original Dispersion mPa · s, 1000 sec$^{-1}$ | Viscosity Redispersion mPa · s, 1000 sec$^{-1}$ |
|---|---|---|---|
| 1 | 99.8/0.2 | 203 | 46 |
| 2 | 98/2 | 205 | 53 |
| 3 | 91/9 | 187 | 68 |
| 4 | 83/17 | 192 | 93 |
| 5 | 50/50 | 219 | 226 |

These results indicate that only the 50/50 MFC/quaternary amine produced a redispersible MFC product. In practice, amounts of quaternary amine should be a minimum of about 75% by weight of the MFC.

EXAMPLE 11

In this example, in place of drying films of the MFC samples, the original 2% MFC dispersions, with and without additive, were spray dried using a laboratory spray dryer having an inlet temperature adjusted to 200° C. Material was pumped to a high speed turbine at 50 ml/minute. Outlet temperature was 67° C. Viscosities were measured, as in the previous examples, before and after drying. Results are shown in Table X.

TABLE X

| Sample | MFC/Additive | Viscosity Original Dispersion mPa · s, 1000 sec$^{-1}$ | Viscosity Redispersion mPa · s, 1000 sec$^{-1}$ |
|---|---|---|---|
| 1 | 100 MFC/ no additive | 195 | 4 |
|  | sucrose |  |  |
| 2 | 66.7/33.3 | 195 | 70 |
| 3 | 50/50 | 195 | 199 |
|  | glycerin |  |  |
| 4 | 66.7/33.3 | 193 | 9 |
| 5 | 50/50 | 193 | 103 |
|  | propylene glycol |  |  |
| 6 | 66.7/33.3 | 193 | 4 |
| 7 | 50/50 | 193 | 16 |

The control sample (1) of spray dried MFC with no additive had virtually no viscosity at all indicating more severe drying than occurs with film at 60° C. The sucrose additive at 50/50 level was the most effective additive in this example. The glycerin test at 66.7/33.3 and both of the propylene glycol tests had severe additive losses through volatility in the dryer.

The additive may be mixed or dissolved in the microfibrillated cellulose or it may be added to cellulosic pulp, which preferably has not previously been dried, prior to microfibrillation. Previous work has established that never-dried pulps were more responsive to homogenization than dry pulp stocks. Drying the pulp with the additive present is equivalent to about 5 passes through the homogenizer. This is illustrated in the following example.

EXAMPLE 12

Samples of a bleached sulfite pulp which were at a 30% consistency and had not previously been dried were treated with a dry additive at either 67/33 or 50/50 levels of MFC/additive, or in the case of the control, with no additive. The pulp and additive were thoroughly mixed, dried at 60° C. and dry cut to 0.7 mm fiber length. Slurries containing 2% of the cellulosic pulp were then microfibrillated as in Example 1 by passing through the homogenizer from 2 to 10 times. Films of the MFC were then prepared and dried at 60° C. as in the previous examples. Table XI shows the viscosity of the original MFC dispersions after various numbers of passes through the homogenizer. It also shows the viscosity levels after drying and redispersing the 10 pass MFC samples.

TABLE XI

| Sample | MFC/Additive |  | Viscosity Original Dispersion mPa · s, 1000 sec$^{-1}$ | Viscosity Redispersion mPa · s, 1000 sec$^{-1}$ |
|---|---|---|---|---|
| 1 | 100 MFC/ | 5 pass | 70 |  |
|  | no additive | 10 pass | 144 | 20-30 |
| 2 | sucrose |  |  |  |
|  | 66/33 | 5 pass | 164 |  |
|  |  | 10 pass | 219 | 131 |
|  | 50/50 | 2 pass | 82 |  |
|  |  | 5 pass | 201 |  |
|  |  | 10 pass | 258 | 244 |
| 3 | glycerin |  |  |  |
|  | 77/23 | 5 pass | 152 |  |
|  |  | 10 pass | 217 | 127* |
|  | 81/19 | 5 pass | 135 |  |
|  |  | 10 pass | 254 | 78* |

*The loss of glycerin on drying reduced the MFC/glycerin weight ratio from 67/33 to 77/23 and from 75/25 to 81/19.

The above table indicates that the additive may be used to reduce homogenization energy by 50% or more. That is, both the 67/33 and 50/50 MFC/sucrose samples prepared by 5 passes through the homogenizer had higher original viscosity than the 100% MFC prepared by 10 passes through the homogenizer. Moreover, the Table XI results also show that by mixing the additive with the cellulose prior to homogenization, the stresses introduced by drying before homogenization are essentially eliminated while the dispersibility of the cellulose, after homogenization, is substantially maintained.

I claim:

1. Dry microfibrillated cellulose containing in admixture a compound capable of substantially inhibiting hydrogen bonding between the fibrils in the cellulose characterized by having a viscosity when redispersed in water of at least 50% of the viscosity of an equivalent concentration of said microfibrillated cellulose dispersed in water prior to drying, said microfibrillated cellulose having been prepared by repeated passage of a liquid suspesion of cellulose fibers through a high pressure homogenizer having a small diameter orifice in which said suspension is subjected to a pressure drop of at least 3000 psi followed by a high velocity decelerating impact against a solid surface, said microfibrillated cellulose further characterized by having a settling volume after 60 minutes in a 0.5% by weight suspension in water of greater than 60%.

2. The dry microfibrillated cellulose of claim 1 having a viscosity when redispersed in water of at least 75% of the viscosity of an equivalent concentration of said microfibrillated cellulose dispersed in water prior to drying.

3. The dry microfibrillated cellulose of claim 1 in which the compound is present as an additive at levels of at least one half the weight of the cellulose.

4. The dry microfibrillated cellulose of claim 1 in which the compound is a polyhydroxy compound.

5. The dry microfibrillated cellulose of claim 4 in which the compound is a polyhydroxy compound selected from the group consisting of a carbohydrate, a glycol and derivatives thereof.

6. The dry microfibrillated cellulose of claim 5 in which the compound is a carbohydrate.

7. The dry microfibrillated cellulose of claim 6 in which the carbohydrate is sucrose in an amount of about one half to two times the weight of the cellulose.

8. The dry microfibrillated cellulose of claim 5 in which the polyhydroxy compound is a glycol selected from the group consisting of ethylene, propylene, dipropylene and butylene glycol.

9. The dry microfibrillated cellulose of claim 1 in which the compound is an alkali metal salt of a borate, polyborate, phosphate or polyphosphate.

10. The dry microfibrillated cellulose of claim 1 in which the compound is an aprotic solvent.

11. The dry microfibrillated cellulose of claim 6 in which the carbohydrate is dextrin.

12. A process of preparing dry redispersible microfibrillated cellulose comprising microfibrillating cellulose by repeatedly passing a liquid suspension of cellulose fibers through a high pressure homogenizer having a small diameter orifice in which said suspension is subjected to a pressure drop of at least 3000 psi followed by a high velocity decelerating impact against a solid surface, said microfibrillated cellulose having a settling volume after 60 minutes in a 0.5% by weight suspension in water of greater than 60%, and drying the suspension of microfibrillated cellulose in the presence of a compound capable of substantially inhibiting hydrogen bonding between the fibrils in the cellulose.

13. The process of claim 12 in which the compound is selected from the group consisting of a polyhydroxy compound, an alkali metal salt and an aprotic solvent and a quaternary amine.

14. The process of claim 13 in which the polyhydroxy compound is selected from the group consisting of a carbohydrate, a glycol and derivatives thereof.

15. The process of claim 12 in which compound is added to said liquid suspension prior to microfibrillation of the cellulose.

16. The process of claim 12 in which the additive is added to said suspension of microfibrillated cellulose after microfibrillation of the cellulose.

17. The process of claim 12 in which the suspension is dried at a temperature of from 50°–70° C.

18. The process of claim 14 in which the polyhydroxy compound is a carbohydrate.

19. The process of claim 18 in which the carbohydrate is a sugar.

20. The process of claim 19 in which the sugar is sucrose in an amount of at least one half the weight of cellulose.

* * * * *